United States Patent
Sasaki et al.

(10) Patent No.: US 9,638,318 B2
(45) Date of Patent: May 2, 2017

(54) CONTROL DEVICE FOR CONTINUOUSLY VARIABLE TRANSMISSION

(71) Applicants: JATCO Ltd, Fuji-shi, Shizuoka (JP); NISSAN MOTOR CO., LTD., Yokohama-shi, Kanagawa (JP)

(72) Inventors: Kiyofumi Sasaki, Fuji (JP); Youji Itou, Sagamihara (JP)

(73) Assignees: JATCO Ltd, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 15/023,180

(22) PCT Filed: Oct. 17, 2014

(86) PCT No.: PCT/JP2014/077632
§ 371 (c)(1),
(2) Date: Mar. 18, 2016

(87) PCT Pub. No.: WO2015/076041
PCT Pub. Date: May 28, 2015

(65) Prior Publication Data
US 2016/0230886 A1    Aug. 11, 2016

(30) Foreign Application Priority Data
Nov. 22, 2013 (JP) ................................. 2013-241424

(51) Int. Cl.
*F16H 55/56* (2006.01)
*F16H 61/662* (2006.01)
(Continued)

(52) U.S. Cl.
CPC ........... *F16H 61/662* (2013.01); *F16H 59/44* (2013.01); *F16H 2059/446* (2013.01); *F16H 2059/465* (2013.01); *F16H 2061/6629* (2013.01)

(58) Field of Classification Search
CPC ......... F16H 61/66272; F16H 2059/465; F16H 61/6649; Y10T 477/6237; Y10T 477/624
(Continued)

(56) References Cited

U.S. PATENT DOCUMENTS 4,619,629 A * 10/1986 Shigematsu .......... B60W 30/18
474/18
4,759,212 A * 7/1988 Sawada ................... G01P 21/02
73/115.02
(Continued)

FOREIGN PATENT DOCUMENTS

JP  62-068142 A  3/1987
JP  62-137454 A  6/1987
JP  2004-124968 A  4/2004

*Primary Examiner* — Henry Liu
(74) *Attorney, Agent, or Firm* — Foley & Lardner LLP

(57) ABSTRACT

There are provided a continuously variable transmission (CVT) in which a belt (7) is wound around a primary pulley (5) and a secondary pulley (6) to transmit power; a primary pulley rotational speed sensor (13) for detecting a rotational speed of the primary pulley (5); a vehicle stopped state determination means for determining whether a vehicle is in a stopped state; a belt slippage detection means for detecting belt slippage on the basis of a signal of the primary pulley rotational speed sensor (13); and a prohibition means for prohibiting detection of the belt slippage by the belt slippage detection means when a parking range or a neutral range is selected by a shift lever operation by a driver. In the vehicle stopped state during selection of the parking range or the neutral range, the rotational speed of the primary pulley (5) is not basically output, and the belt slippage does not occur.

(Continued)

Thus, erroneous detection of the belt slippage can be avoided by prohibiting the detection of the belt slippage in this case.

2 Claims, 1 Drawing Sheet

(51) Int. Cl.
*F16H 59/46* (2006.01)
*F16H 59/44* (2006.01)

(58) Field of Classification Search
USPC .............................................. 474/8
See application file for complete search history.

(56) References Cited

U.S. PATENT DOCUMENTS

| | | | | |
|---|---|---|---|---|
| 5,351,192 | A * | 9/1994 | Tsuyama | B60K 28/16 180/197 |
| 5,643,116 | A * | 7/1997 | Genzel | F16H 59/38 474/11 |
| 6,428,445 | B1 * | 8/2002 | Friedmann | F16H 57/0434 474/28 |
| 6,602,160 | B2 * | 8/2003 | Tsutsui | F16H 61/66272 474/28 |
| 7,806,790 | B2 * | 10/2010 | Iwatsuki | F16H 61/66272 474/11 |
| 8,600,634 | B2 * | 12/2013 | Van Der Sluid | F16H 61/66272 474/11 |
| 8,924,104 | B2 * | 12/2014 | Natori | F16H 61/66259 701/51 |
| 2001/0002549 | A1 * | 6/2001 | Reuschel | G01M 13/023 73/115.01 |
| 2001/0049315 | A1 * | 12/2001 | Tsutsui | F16H 61/66272 477/44 |
| 2005/0192131 | A1 * | 9/2005 | Yamamoto | F16H 61/66272 474/18 |
| 2006/0183581 | A1 * | 8/2006 | Iwatsuki | F16H 61/66272 474/8 |
| 2006/0234828 | A1 * | 10/2006 | Iwatsuki | B60W 10/06 477/45 |
| 2007/0010373 | A1 * | 1/2007 | Meyer | F16H 61/061 477/143 |
| 2008/0288145 | A1 * | 11/2008 | Maeda | F16H 61/0437 701/53 |
| 2010/0197454 | A1 * | 8/2010 | Iwatsuki | F16H 61/66272 477/44 |
| 2010/0197455 | A1 * | 8/2010 | Iwatsuki | F16H 61/66272 477/44 |
| 2014/0106933 | A1 * | 4/2014 | Tatewaki | F16H 61/02 477/92 |
| 2014/0207347 | A1 * | 7/2014 | Waku | F16H 61/702 701/54 |
| 2014/0207348 | A1 * | 7/2014 | Wakayama | F02D 17/00 701/54 |

* cited by examiner

CONTROL DEVICE FOR CONTINUOUSLY VARIABLE TRANSMISSION

TECHNICAL FIELD

The present invention relates to a control device for a continuously variable transmission that can steplessly change gear ratios when power between pulleys is transmitted by a belt.

BACKGROUND ART

As the control device for the continuously variable transmission of this type, a control device described in Patent Publication 1 has been suggested. In a technique described in this Patent Publication 1, in the cases where a rotational speed of a primary pulley becomes higher than a value that is obtained by multiplying a maximum gear ratio that can be obtained as a mechanism by a rotational speed of a secondary pulley and where an engine speed is at least equal to a specified value, a determination of belt slippage is made, and belt slippage protection control is executed.

However, there is a case where an engine reaches a high speed and causes vibration of the primary pulley when an accelerator pedal is operatively depressed in a state where a driver sets a shift lever in a P range or an N range. Depending on a position of the primary pulley, a sensor for detecting the rotational speed of the primary pulley possibly outputs a pulse signal due to such vibration, and, in this case, the control device erroneously recognizes the mere vibration as rotation of the primary pulley. Because a vehicle is at a stop, and the secondary pulley does not rotate at this time, such a problem that occurrence of the belt slippage is determined and the belt slippage protection control is executed arises.

PRIOR ART PUBLICATION

Patent Publication

Patent Publication 1: JP-A-2004-124968

SUMMARY OF THE INVENTION

The present invention has been made by focusing on the above problem and therefore has a purpose of providing a control device for a continuously variable transmission that can avoid erroneous detection of belt slippage.

In order to achieve the above purpose, the control device for the continuously variable transmission of the present invention includes: a continuously variable transmission in which a belt is wound around a primary pulley and a secondary pulley to transmit power; a clutch that is provided between a drive source and the primary pulley and cancels or generates a power transmission state; a primary pulley rotational speed sensor for detecting a rotational speed of the primary pulley; a stopped state determination means for determining whether a vehicle is in a stopped state; a belt slippage detection means for detecting belt slippage on the basis of a signal of the primary pulley rotational speed sensor; and a prohibition means for prohibiting detection of the belt slippage by the belt slippage detection means in the case where it is determined that the vehicle is in the stopped state and a neutral range is selected by a shift lever operation by a driver, wherein, in a case where the vehicle is not in the stopped state even when the neutral range is selected, the belt slippage is detected by the belt slippage detection means.

According to the present invention, when the neutral range is selected and the vehicle is in the stopped state, the rotational speed of the primary pulley is not basically generated, and the belt slippage does not occur. Therefore, erroneous detection of the belt slippage can be avoided by prohibiting the detection of the belt slippage in this case.

MODE FOR IMPLEMENTING THE INVENTION

Figure 1:
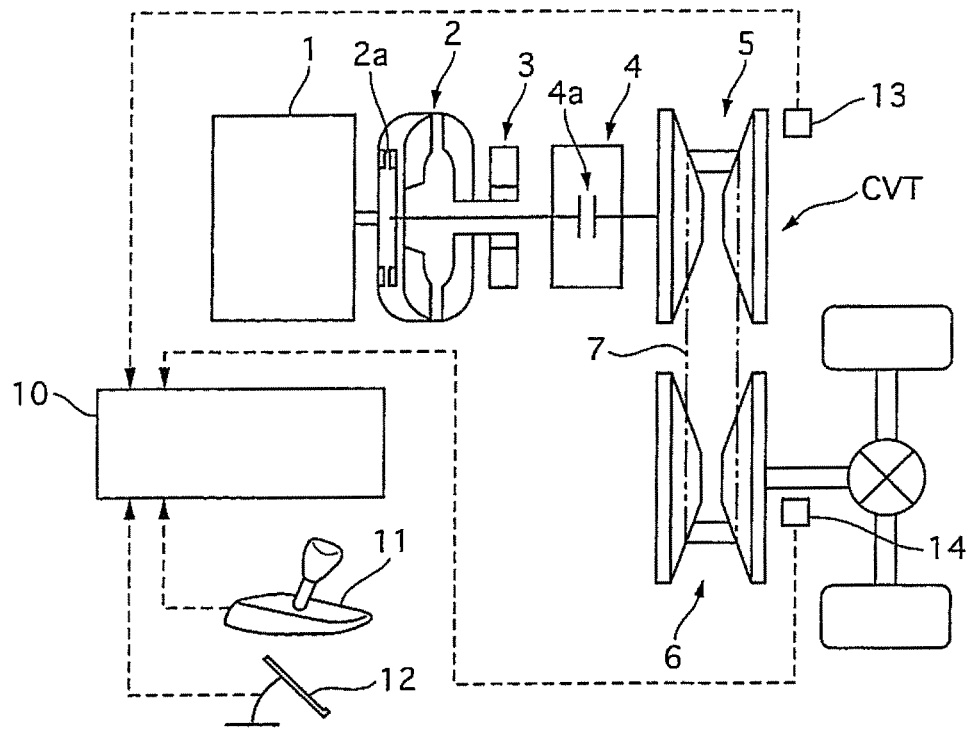
FIG. 1 is a system diagram that illustrates an embodiment of a control device for a continuously variable transmission according to the present invention.

FIG. 1 is a system diagram that illustrates a specific embodiment of a control device for a continuously variable transmission according to the present invention. A vehicle in this embodiment has an engine 1 as an internal combustion engine, a torque converter 2, an oil pump 3, a forward/reverse travel switching mechanism 4, and a belt-type continuously variable transmission CVT, and transmits drive power to drive wheels via a differential gear. The torque converter 2 has a pump impeller that integrally rotates with a drive nail for driving the oil pump 3; a turbine runner that is connected to an input side of the forward/reverse travel switching mechanism 4; and a lockup clutch 2a that can integrally couple these pump impeller and turbine runner. The forward/reverse travel switching mechanism 4 is configured by including a planetary gear mechanism and plural clutches 4a and switches between forward travel and reverse travel in accordance with engagement states of the clutches 4a. The belt-type continuously variable transmission CVT has a primary pulley 5 that is connected to an output side of the forward/reverse travel switching mechanism 4; a secondary pulley 6 that integrally rotates with the drive wheels; and a belt 7 that is wound around the primary pulley 5 and the secondary pulley 6 to transmit the power.

A control unit 10 reads a range position signal (hereinafter, the range position signals are described as a P range, an R range, an N range, and a D range) from a shift lever 11 that selects a range position through an operation by a driver; an accelerator pedal operation amount signal (hereinafter referred to as APO) from an accelerator pedal operation amount sensor 12; a primary rotational speed signal Npri from a primary pulley rotational speed sensor 13 that detects a rotational speed of the primary pulley 5; and a secondary rotational speed signal Nsec from a secondary pulley rotational speed sensor 14 that detects a rotational speed of the secondary pulley 6. In addition, regular unevenness is radially formed on lateral surfaces that are on sides opposite from belt holding sides of each of the pulleys with a rotational shaft being a center. Each of the primary pulley rotational speed sensor 13 and the secondary pulley rotational speed sensor 13 is arranged to face this unevenness, reads a state where a magnetic field that is generated by a coil provided in the sensor is changed by the unevenness, and detects a pulse-like signal.

The control unit 10 controls the engagement state of the clutch 4a that corresponds to the range position signal. More specifically, the clutch 4a is brought into a disengaged state in the P range or the N range, a reverse clutch (or a brake)

is engaged in the R range such that the forward/reverse travel switching mechanism 4 outputs reverse rotation, and the forward clutch 4a is engaged in the D range such that the forward/reverse travel switching mechanism 4 integrally rotates to output forward rotation. In the P range, the clutch 4a and the reverse clutch are brought into the disengaged states, and an unillustrated parking lock mechanism is actuated, so as not to bring the vehicle into a travel state. That is, when the P range is selected by the driver, the vehicle is in a stopped state. In addition, a vehicle speed is computed on the basis of the secondary rotational speed Nsec, and a target gear ratio is set on the basis of the APO signal and the vehicle speed. Then, hydraulic pressure of each of the pulleys is controlled on the basis of the target gear ratio by feed forward control, an actual gear ratio is detected on the basis of the primary rotational speed signal Npri and the secondary rotational speed signal Nsec, and the hydraulic pressure of each of the pulleys is subjected to feedback control such that the set target gear ratio and the actual gear ratio match each other. In addition, a unit for the hydraulic control may be a unit that can separately control the pulley hydraulic pressure of the primary pulley 5 and the pulley hydraulic pressure of the secondary pulley 6, may be a unit that controls the hydraulic pressure of one of the pulleys in a state where the hydraulic pressure corresponding to line pressure is supplied to the other, and is not particularly limited.

A belt slippage detection section 10a for detecting slippage of the belt 7 is provided in the control unit 10. In the belt slippage detection section 10a, it is determined whether the primary rotational speed Npri detected by the primary pulley rotational speed sensor 13 is at least equal to a slippage determination value that is obtained by multiplying the secondary rotational speed Nsec by a minimum gear ratio, and it is determined that the belt slippage occurs when the primary rotational speed Npri is at least equal to the slippage determination value. Even when the actual gear ratio in a state without the belt slippage is unknown, it is assumed that the gear ratio of the continuously variable transmission CVT is the minimum gear ratio, and the primary rotational speed Npri with respect to the secondary rotational speed Nsec is set as the slippage determination value. Accordingly, when the primary rotational speed Npri becomes the even higher rotational speed, it can be considered that the belt slippage occurs. In addition, because a case where the secondary pulley rotational speed Npri is zero can also be considered, determination sensitivity may be adjusted by applying a specified offset value, and the slippage determination value is not particularly limited.

Here, a case where the detection of the belt slippage based on a detection signal of the primary rotational speed sensor 13 is erroneously detected during a stop of the vehicle will be described. As described above, the primary rotational speed sensor 13 reads a change of the unevenness formed on the primary pulley 5 and thereby detects the rotational speed. At this time, in the case where a position of the unevenness that faces the primary pulley rotational speed sensor 13 is a position in a substantially boundary portion between a recess and a projection in a state where the rotational speed of the primary pulley 5 is zero, that is, where the vehicle is stopped, the primary pulley 5 is at a stop. However, for example, in the case where the accelerator pedal is depressed and the engine 1 runs idle, the primary pulley rotational speed sensor 13 possibly faces the recess and the projection in a back and forth manner due to the vibration. In such a case, the primary pulley rotational speed sensor 13 possibly outputs the pulse signal, and the control unit 10 possibly recognizes generation of the rotational speed of the primary pulley 5 even without the rotation of the primary pulley 5.

Meanwhile, the slippage determination value is computed on the basis of the secondary rotational speed Nsec in the belt slippage detection section 10a, and a small value is set as the slippage determination value when the secondary rotational speed Nsec is zero. At this time, the belt slippage is detected when the primary rotational speed Npri becomes higher than the slippage determination value. In the case where the belt slippage is detected, for example, control for increasing the line pressure, control for reducing output torque of the engine 1 to prevent the slippage, or the like interferes as control for protection against the belt slippage. As a result, even when a vehicle start is attempted by shifting from the P range to the D range, for example, a desired starting state may not be obtained, and the driver may receive a sense of discomfort. In view of this, in this embodiment, it is determined that the belt slippage does not occur at a time when the vehicle is in the stopped state in the P range or the N range, and the detection of the belt slippage is prohibited. In this way, the erroneous detection as described above is avoided.

Figure 2:
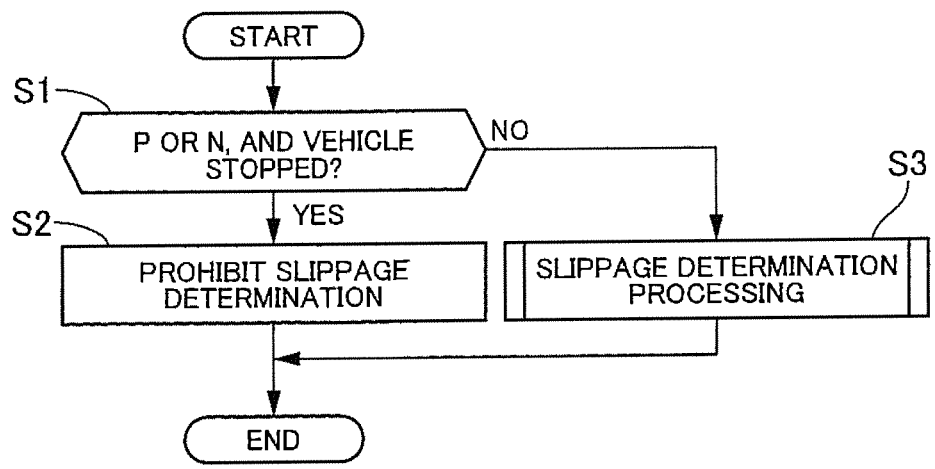
FIG. 2 is a flowchart that illustrates belt slippage detection prohibition processing in the above embodiment.

FIG. 2 is a flowchart that illustrates belt slippage detection prohibition processing in this embodiment.

It is determined in step S1 whether the vehicle is in the stopped state in the P range or the N range. If the condition is satisfied, the processing proceeds to step S2, and the detection of the belt slippage by the belt slippage detection section 10a is prohibited. On the other hand, if the condition is not satisfied, the processing proceeds to step S3, and the detection of the belt slippage by the belt slippage detection section 10a is conducted. In this way, the erroneous detection of the belt slippage can be avoided.

That is, in the case where the D range or the R range is selected, the driver has an intention of driving, and the belt slippage has to be detected in this case even when the vehicle is in the stopped state. However, when the vehicle is in the stopped state in the P range or the N range, the driver has no intention of driving, and the clutch 4a is disengaged. Thus, there is no need to worry about the belt slippage.

By the way, the clutch 4a is disengaged in the vehicle stopped state in the P range or the N range in which the detection of the belt slippage is not stopped. In the case where the engine runs idle in this state, the primary pulley 5 is more likely to be slightly vibrated due to an influence of engine vibration or an influence of drag torque of the clutch 4a in comparison with a time during the engagement of the clutch 4a, and thus the rotational speed is possibly detected. This erroneous detection possibly leads to unnecessary execution of belt slippage inhibition control, such as lighting of an abnormality lamp for reporting the occurrence of the belt slippage, the unnecessary increase of the line pressure, and excess suppression of the engine torque at a time when the vehicle travel is actually attempted by shifting to the D range. In this embodiment, these problems are avoided by prohibiting the detection of the belt slippage in the vehicle stopped state in the P range or the N range.

As it has been described so far, operational effects that will be listed below can be obtained in this embodiment.

(1) The control device includes the continuously variable transmission CVT in which the belt is wound around the primary pulley 5 and the secondary pulley 6 to transmit the power; the clutch 4a that is provided between the engine (a drive source) 1 and the primary pulley 5 and cancels or generates a power transmission state; the primary pulley rotational speed sensor 13 that detects the rotational speed of the primary pulley 5; the belt slippage detection section (a belt slippage detection means) 10a that detects the belt slippage on the basis of the signal of the primary pulley rotational speed sensor 13; and step S3 (a prohibition means) that prohibits the detection of the belt slippage by the belt slippage detection section 10a at a time when it is determined in step S1 that the vehicle is in the stopped state in the P range or the N range. In this way, during the stop of the vehicle in the P range or the N range, the driver has no intention of driving, and the clutch 4a is disengaged. Thus, the rotational speed of the primary pulley 5 is not generated, large torque is not transmitted to a power transmission system, and a state where the belt slippage does not occur in the first place is produced. Therefore, even when the detection of the belt slippage is prohibited, there is no influence on the control, and only the erroneous detection of the belt slippage can be avoided.

(2) In the control device for the continuously variable transmission described in (1), the secondary pulley rotational speed sensor 14 that detects the rotational speed of the secondary pulley 6 is provided. In step S2, if the primary rotational speed Npri is higher than the slippage determination value that is the value obtained by multiplying the secondary rotational speed Nsec detected by the secondary pulley rotational speed sensor 14 by the minimum gear ratio of the continuously variable transmission CVT, the belt slippage is detected. Therefore, the belt slippage can be detected by the rotational speed sensor only.

The invention claimed is:

1. A control device for a continuously variable transmission, comprising:
   a continuously variable transmission in which a belt is wound around a primary pulley and a secondary pulley to transmit power;
   a clutch that is provided between a drive source and the primary pulley and cancels or generates a power transmission state;
   a primary pulley rotational speed sensor for detecting a rotational speed of the primary pulley;
   a stopped state detection unit for detecting whether a vehicle is in a stopped state;
   a belt slippage detection unit for detecting belt slippage on the basis of a signal of the primary pulley rotational speed sensor; and
   a prohibition unit for prohibiting detection of the belt slippage by the belt slippage detection unit in a case where a neutral range is selected by a shift lever operation by a driver and the vehicle is in the stopped state
   wherein, in a case where the vehicle is not in the stopped state even when the neutral range is selected, the belt slippage is detected by the belt slippage detection unit.

2. The control apparatus for a continuously variable transmission according to claim 1, wherein a secondary pulley rotational speed sensor for detecting a rotational speed of the secondary pulley is provided, and
   wherein the belt slippage detection unit detects the belt slippage when the primary rotational speed is higher than a value that is obtained by multiplying secondary rotational speed detected by the secondary pulley rotational speed sensor by a minimum gear ratio of the continuously variable transmission.

* * * * *